July 12, 1932.  W. A. HULL  1,867,318
TUNNEL KILN
Filed Feb. 26, 1930   10 Sheets-Sheet 8
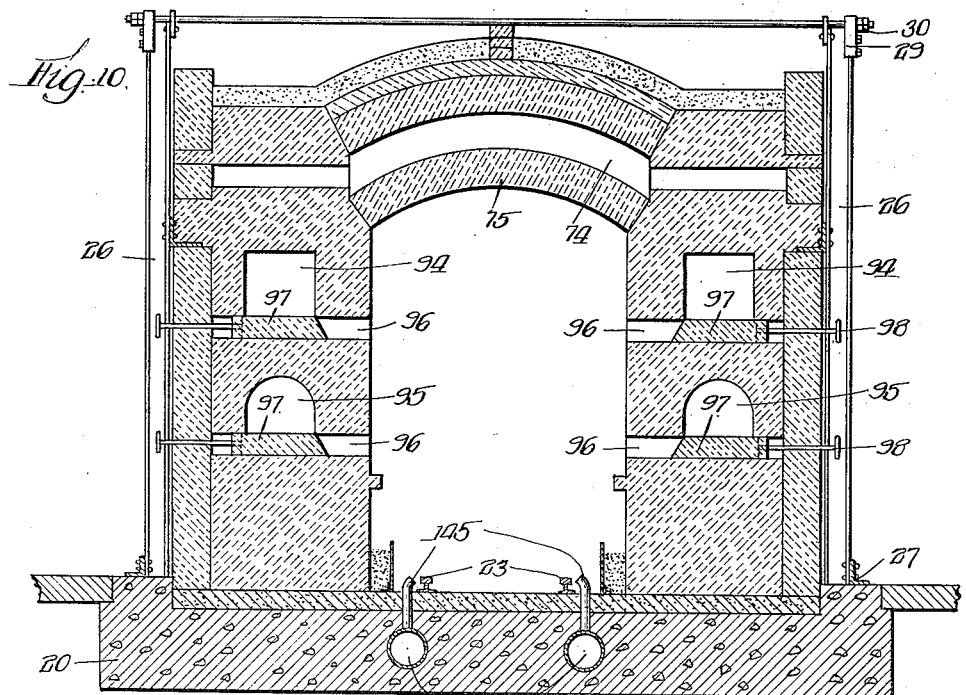
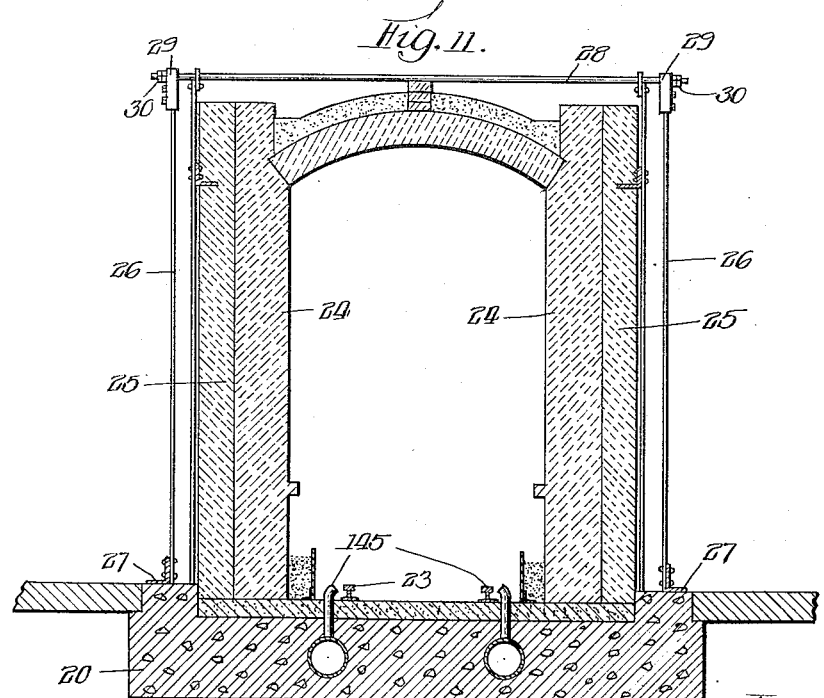
Inventor:
Walter A. Hull,
By Wilkinson, Huxley, Byron & Knight
Attys July 12, 1932.  W. A. HULL  1,867,318
TUNNEL KILN
Filed Feb. 26, 1930    10 Sheets-Sheet 9
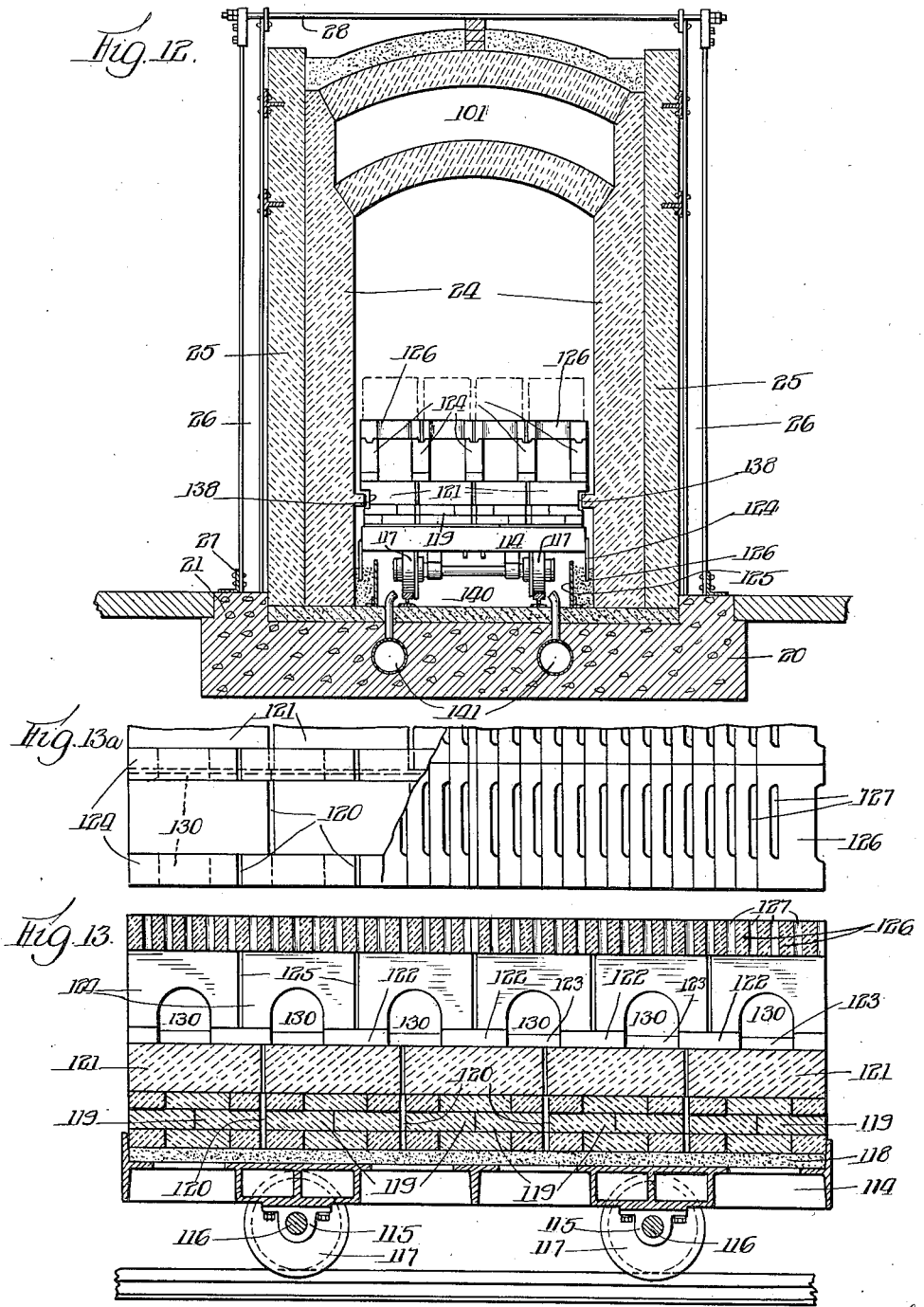

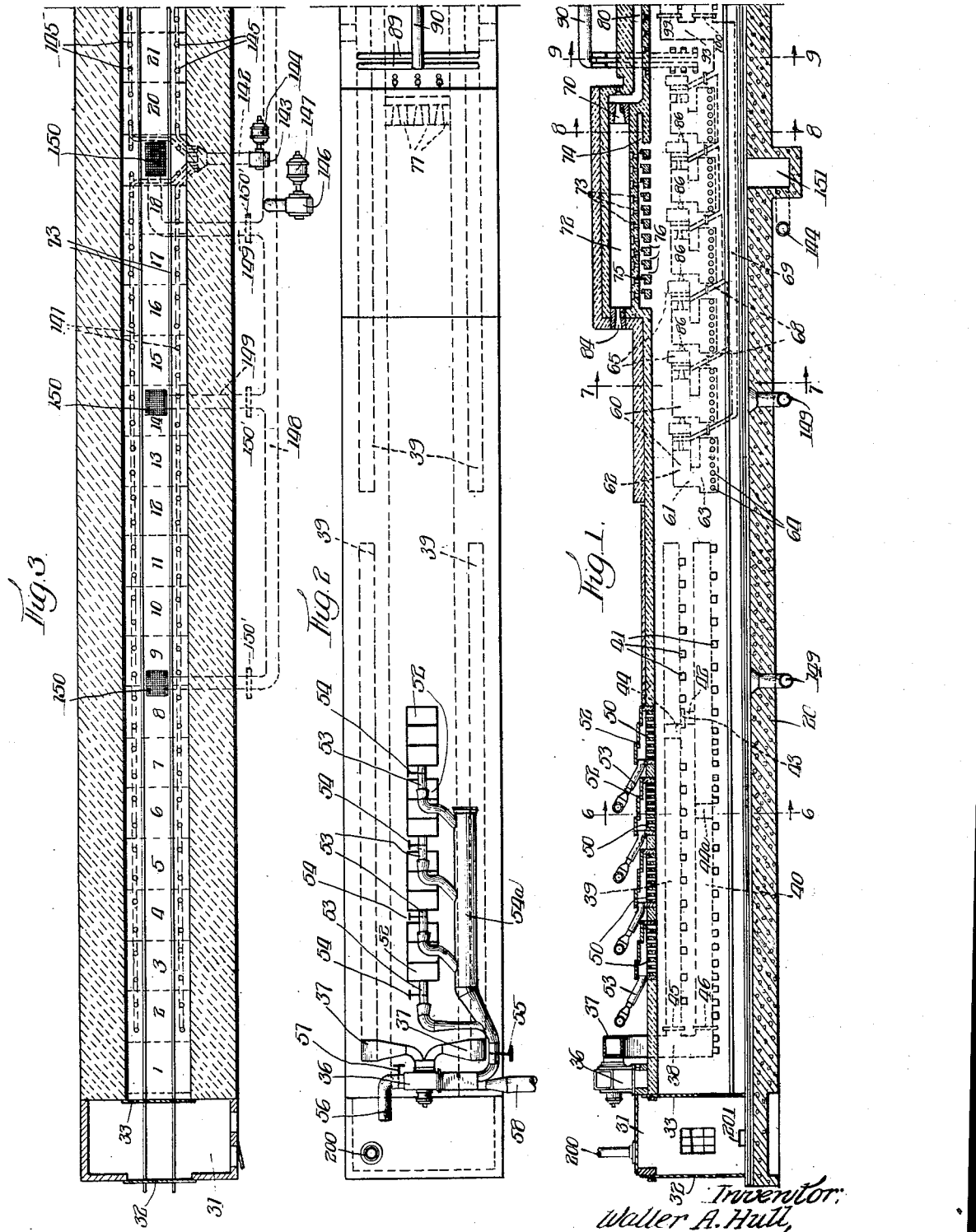

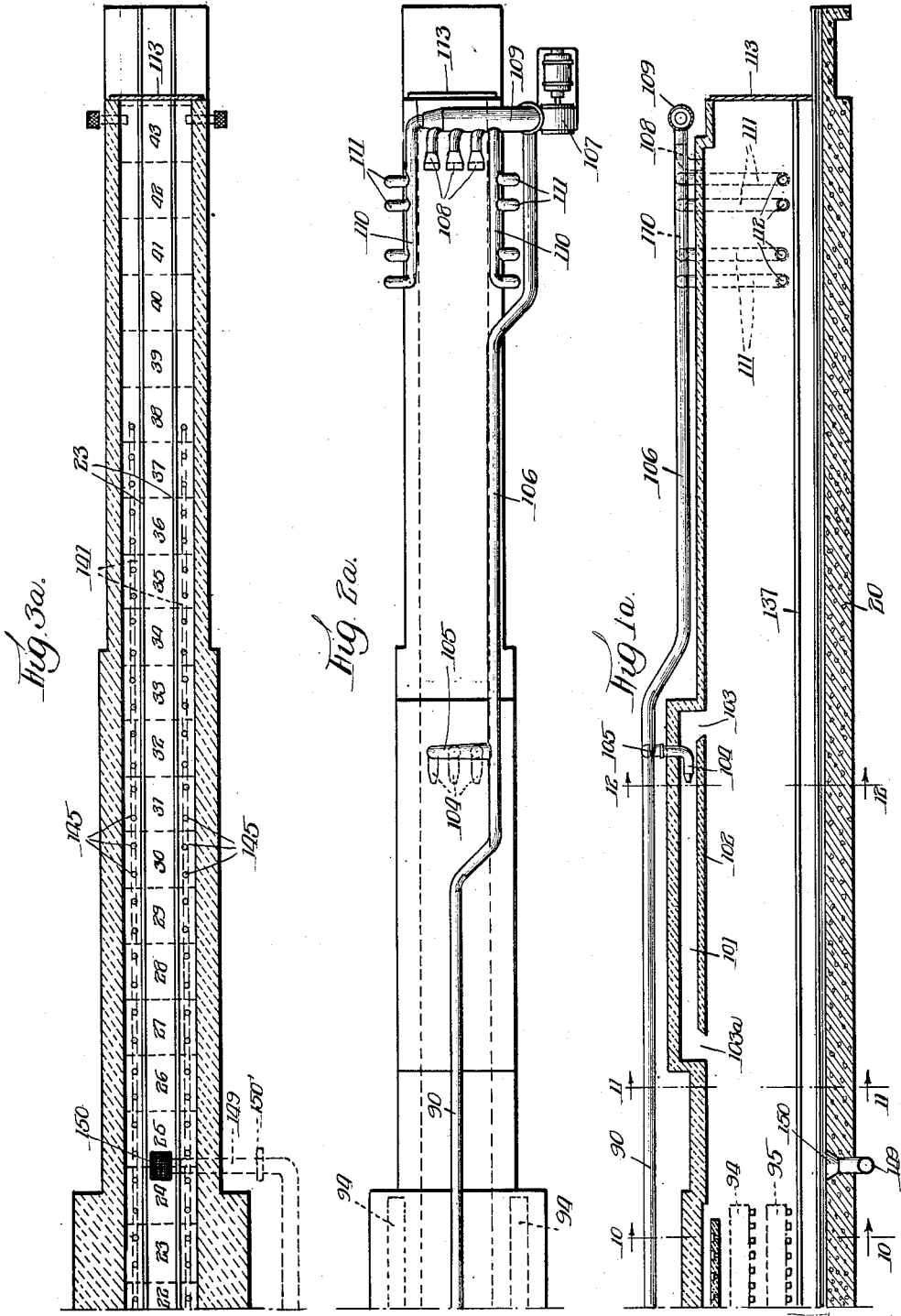

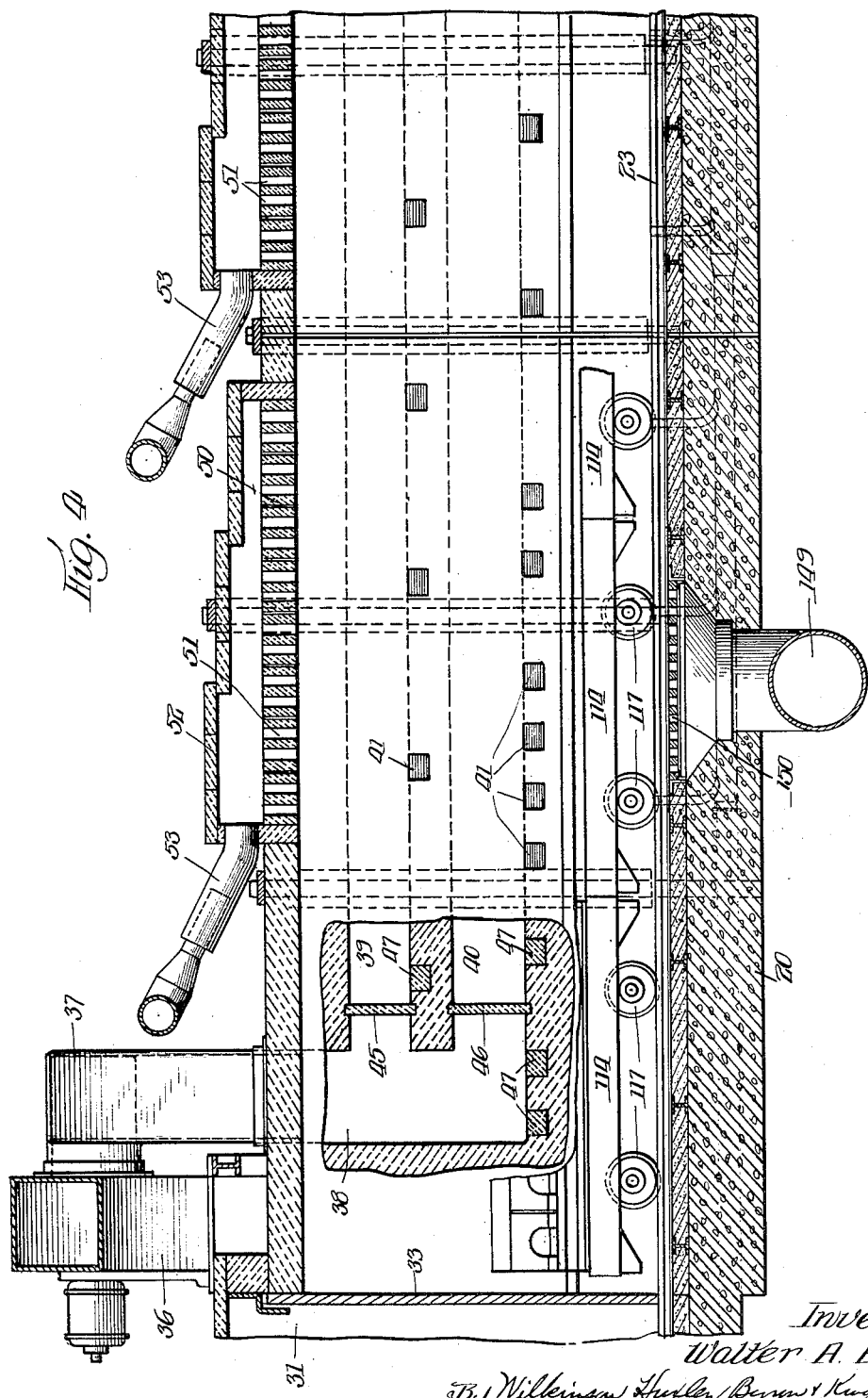

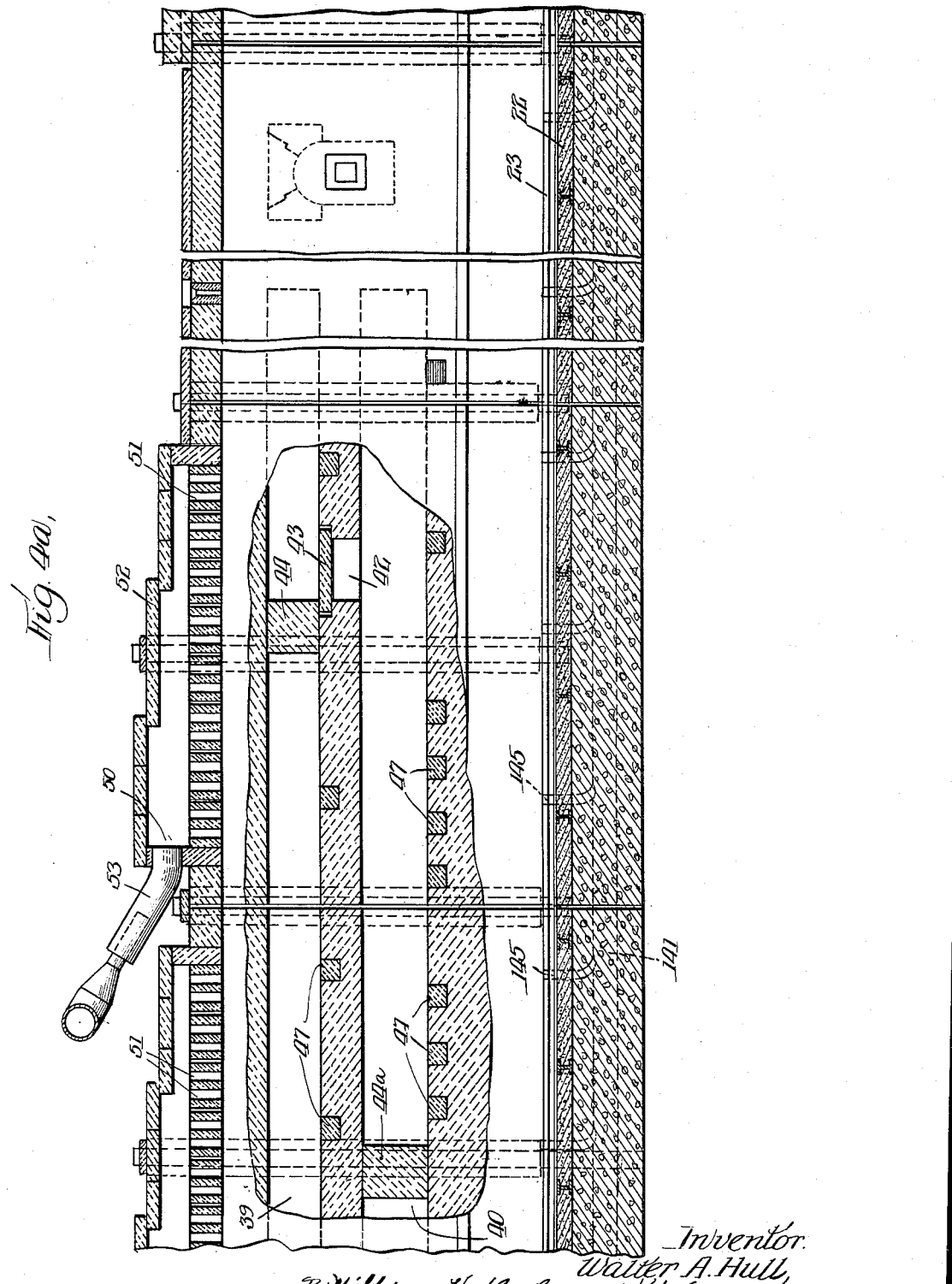

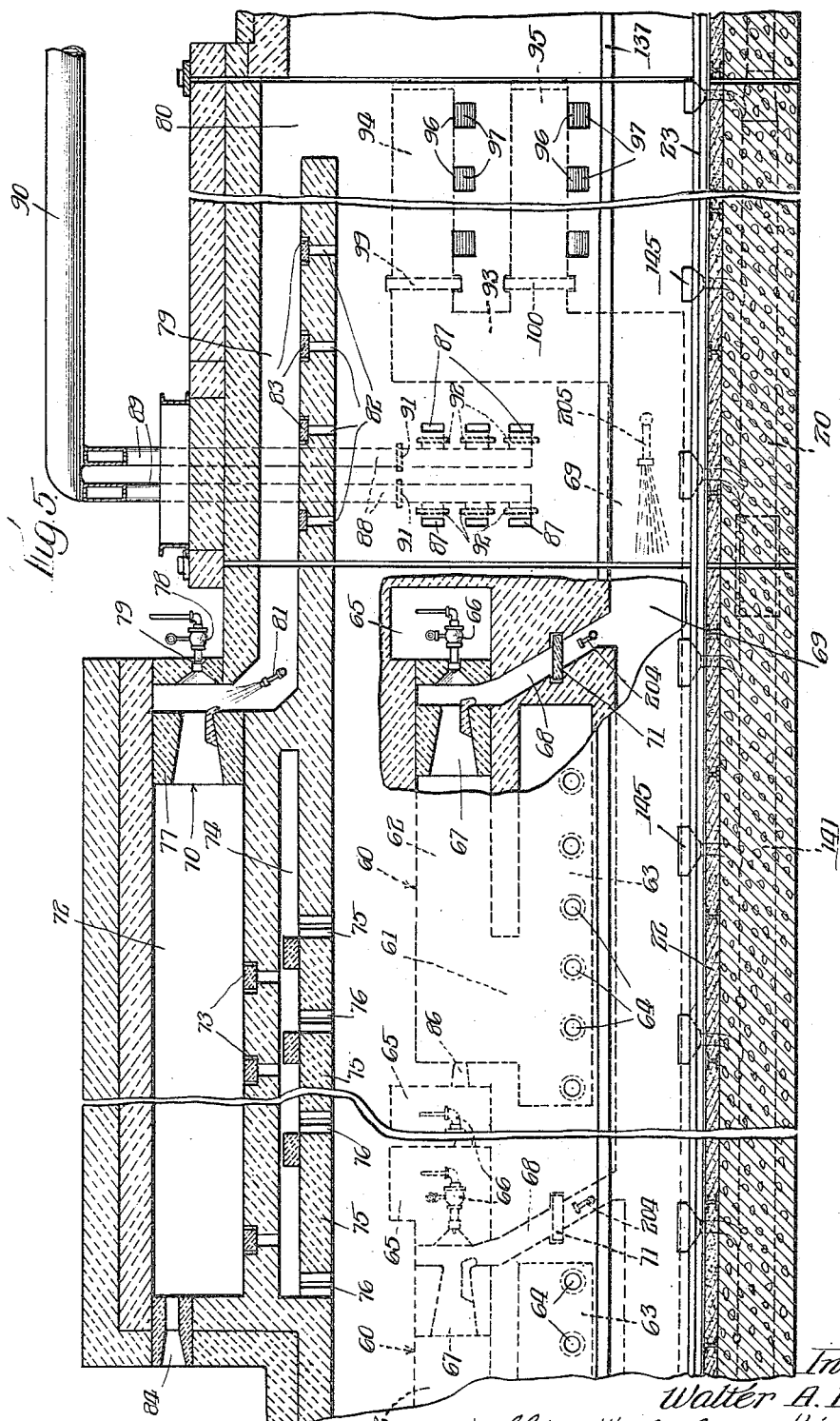

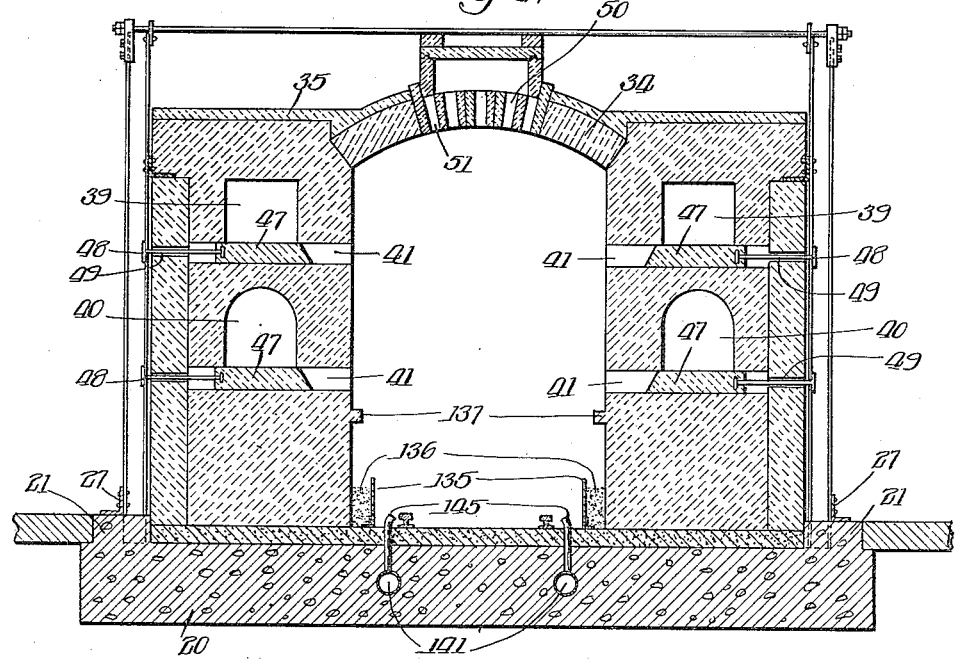
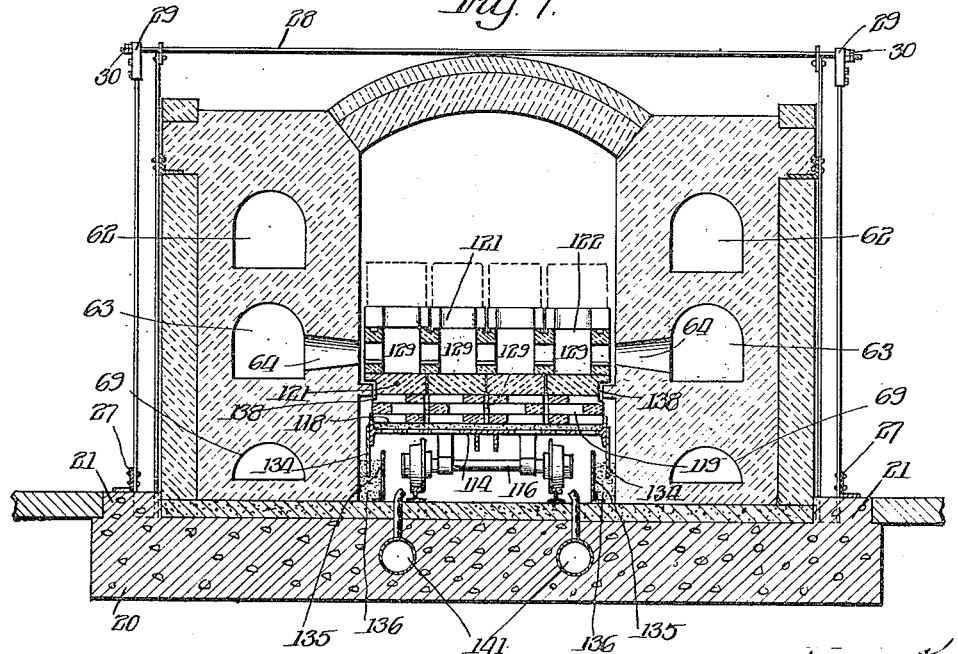

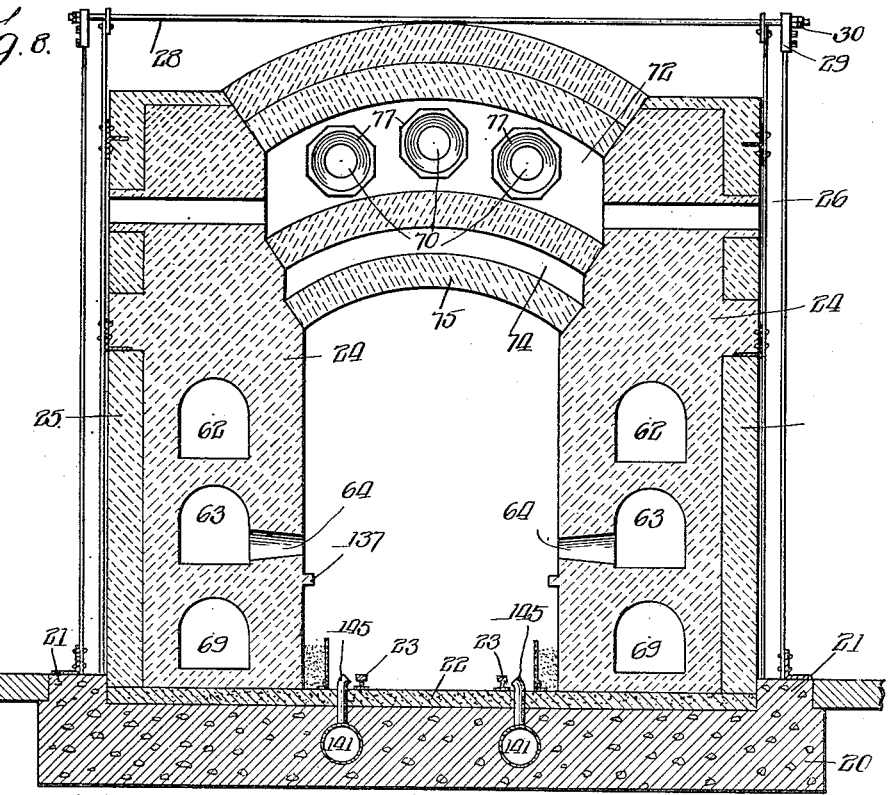
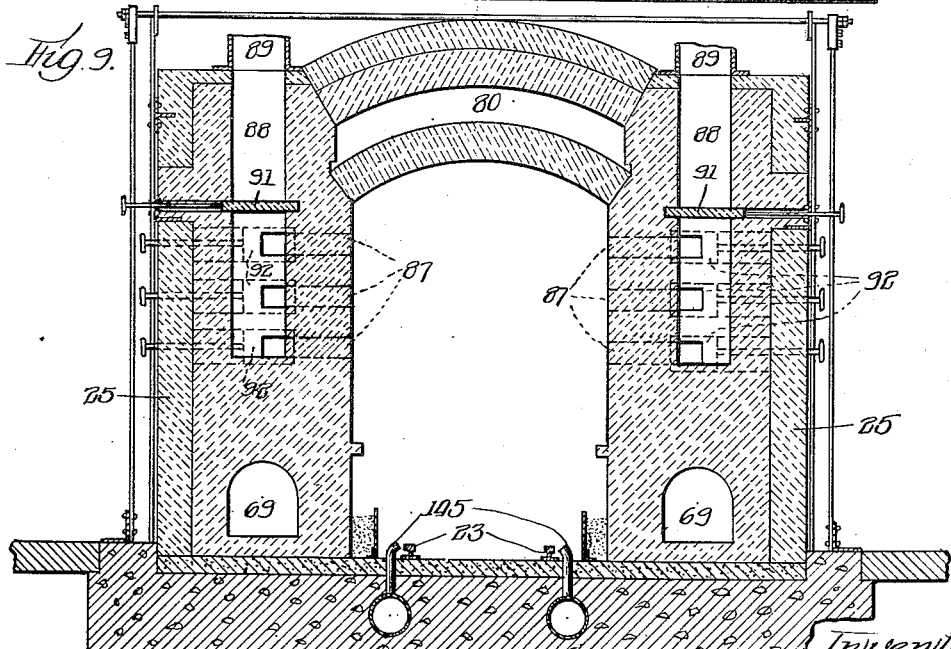

July 12, 1932.  W. A. HULL  1,867,318
TUNNEL KILN
Filed Feb. 26, 1930   10 Sheets-Sheet 10
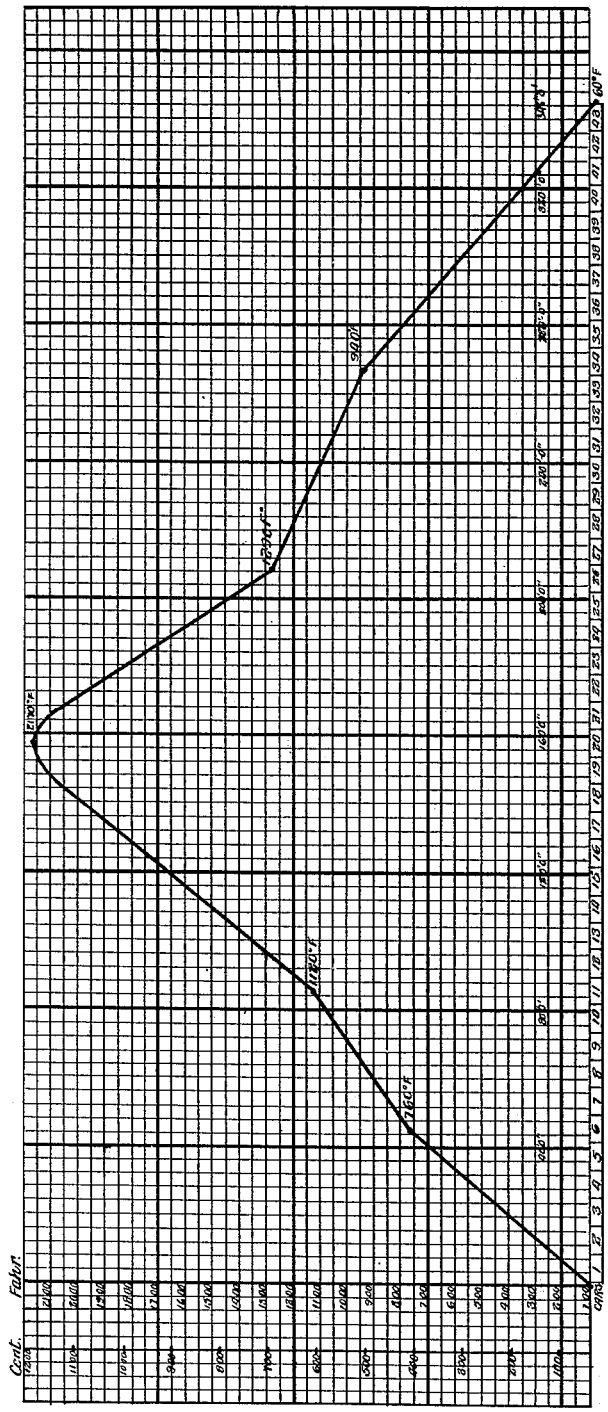
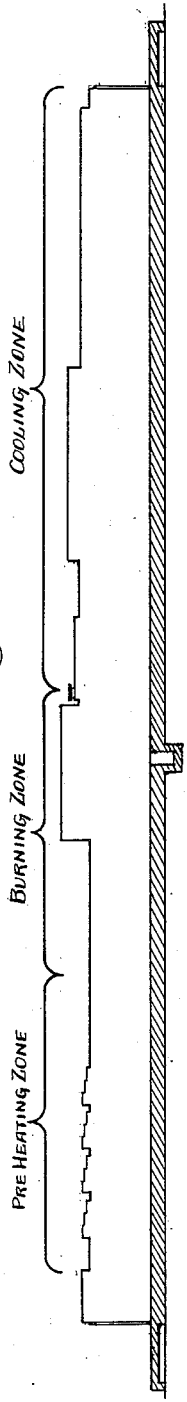
Inventor:
Walter A. Hull,
By Wilkinson, Fisher, Byron & Knight attys Patented July 12, 1932

1,867,318

UNITED STATES PATENT OFFICE

WALTER A. HULL, OF OAK PARK, ILLINOIS

TUNNEL KILN

Application filed February 26, 1930. Serial No. 431,382.

This invention relates to improvements in tunnel kilns and particularly, to a novel construction therefor with provision for the supplying and regulating of heating and cooling fluid currents, whereby a desired and predetermined burning and cooling action of the ware being treated, is produced.

In designing the kiln of this invention, various features and provisions have been incorporated for the purpose of meeting problems which are presented in kilns of this type. In processing, most ceramic products, and more particularly those of large size and relatively complex shape, it has been found that unusual care and precaution must be exercised in cooling the products after they have passed through the burning zone. Experiments have shown that after passing through the burning zone, that the cooling can be accomplished at a relatively rapid rate, down to a certain predetermined point at which it is desirable to continue the cooling at a slower rate.

This slower cooling treatment must be continued throughout a predetermined range, after which, the cooling action may be accelerated. To this end, it is an object of the present invention to provide new and improved means which are readily controlled and are accurate and reliable in results for producing in a tunnel kiln, the above type of cooling action.

It is a further object to provide means whereby the locations at which the changes in the rate of cooling action occur, may be selected as desired, and the rate of cooling throughout the different regions of the kiln may be varied at will.

Another important feature in the treatment of ware in tunnel kilns, is that of providing uniform temperature conditions in the upper and lower portions of corresponding locations in the length thereof.

Difficulty has been encountered in this regard because there is a natural tendency for the upper portion adjacent the roof of the tunnel, to become hotter than the region adjacent the floor. Uniformity of temperature adjacent the roof and the floor of the kiln, is particularly difficult to secure throughout that region of the tunnel constituting the pre-heating zone. Accordingly, a further object of the present invention is to provide a novel and improved construction whereby a greater degree of success is obtained in maintaining uniformity of temperature throughout the upper and lower portions of all corresponding locations in the length of the tunnel.

A further object of the present invention is to provide a construction which will permit a high degree of control throughout the region constituting the pre-heating zone, whereby a predetermined pre-heating action may be accomplished, that is to say, the heating of the ware may be increased gradually and uniformly from the charging end to the burning zone or it may first be heated at one predetermined rate and then throughout the predetermined range heated at a different or slower rate and finally further heated at the original or different rate, as desired.

A further object of the present invention is that of providing means whereby special provision is made for the heating up of the tops of the ware carrying cars at the charging end of the tunnel. This feature has an important bearing on the results obtained in the heating action because, as illustrated in the present disclosure, channels are provided through the car tops for the conveyance of heating and cooling fluids to locations adjacent the ware, and until the car tops become heated to an extent to eliminate them as substantial heat absorbing mediums, they absorb a relatively large quantity of heat, which is a disturbing factor in the control of the treatment. The real advantage derived from this feature is the uniform heating of the ware which is an important object of this invention.

A further object is to provide a heating or burning zone which is highly efficient and is readily controlled to produce predetermined desired results.

A further object is to provide a burning or heating zone in which the heating products of combustion are introduced both at the sides and top thereof. In the present illustration, for convenience, burners are located in the side walls of the tunnel and an independent set of burners on the top.

A further object is to provide combustion chambers and flues which are of such construction that the products of combustion are caused to take a circuitous path in traveling to the ware whereby liability of blasting directly in contact with the ware is eliminated.

It is a further object to provide ware carrying cars of special and novel construction which produce collectively, as positioned end to end in the tunnel in operation, flues or channels for conveyance of the heating and cooling mediums, to locations immediately adjacent the ware carried thereon and to provide other means such as controlled ports, flues and the like, located and constructed in the tunnel walls for cooperation with the flues or channels in the car tops whereby to produce in effect, a system capable of ready and accurate control for accomplishing important steps in the treatment.

It is a further object to provide improved and novel means for maintaining the region of the tunnel located below the cars in cool, safe condition, whereby liability of excessive temperatures with consequent damage to bearings and car parts is eliminated.

It is a further object to provide certain specific means for accomplishing the above stated objects such as for instance, provisions for the re-circulation of the gas, by-passing gas, and the like, all in a manner hereinafter more particularly described.

A further object is to provide a tunnel kiln embodying the above described features which is capable of such ready and accurate control that an improved burning and cooling action is obtained with the production of better products.

The kiln herein contemplated is also capable of large production and is one which makes for greater economy in operation and maintenance and by the use of which, improved products are produced at a lower manufacturing cost.

Various other objects not specifically enumerated are contemplated for the present invention and will readily appear to one skilled in the art, as the following description proceeds.

The present disclosure is merely given by way of illustration and is not to be considered as limiting the invention in any respect. The scope of the invention may be determined from an understanding of the present disclosure with an appreciation of the advantages produced thereby, and with reference to the appended claims.

The following description may be more readily understood by referring to the accompanying drawings in which:

Figure 1 is a side elevational view in cross section showing the pre-heating and burning zones of a tunnel kiln constructed in accordance with the present invention and Figure 1—A is a similar view of the cooling zone;

Figures 2 and 2—A are plan views of the portions of the kiln shown in Figures 1 and 1—A respectively;

Figures 3 and 3—A are cross sectional plan views showing the floor and wall construction of the portions of the kiln shown in Figures 1 and 1—A respectively;

Figures 4 and 4—A are enlarged cross sectional elevational views disclosing that region of the kiln constituting the preheating zone;

Figure 5 is an enlarged side elevational cross sectional view disclosing the region of the kiln constituting the heating or burning zone;

Figure 6 is a cross sectional view in elevation taken on the line 6—6 of Figure 1 and looking in the direction of the arrows;

Figure 7 is a cross sectional view in elevation, taken on the lines 7—7 of Figure 1 and looking in the direction of the arrows and also disclosing one of the cars in position and its relationship to the walls of the tunnel;

Figure 8 is a cross sectional view in elevation taken on the line 8—8 of Figure 1 and looking in the direction of the arrows;

Figure 9 is a cross sectional view in elevation taken on the line 9—9 of Figure 1 and looking in the direction of the arrows;

Figure 10 is a cross sectional view in elevation taken on the line 10—10 of Figure 1ª and looking in the direction of the arrows;

Figure 11 is a cross sectional view in elevation taken on the line 11—11 of Figure 1ª and looking in the direction of the arrows;

Figure 12 is a cross sectional view taken on the line 12—12 of Figure 1, and looking in the direction of the arrows;

Figure 13 is a cross sectional view in side elevation, disclosing a ware carrying car constructed in accordance with the present invention;

Figure 13—A is a fragmentary plan view of the top of the car shown in Figure 13 with a portion of the decking removed to disclose the plan of the underneath structure;

Figure 14 is a chart disclosing one desirable heating and cooling curve which is representative of heating and cooling action which may be accomplished by the use of a tunnel kiln constructed in accordance with the present invention;

Figure 15 is a diagrammatic outline of the tunnel kiln disclosed in the other figures, which is placed with reference to the chart of Figure 14, to disclose the locations throughout the length of the kiln at which the various changes in temperature occur.

Before proceeding with the detail description of the drawings, it is deemed advisable to point out in a general way, some of the characteristic principles of the present type of kiln.

By referring to the chart shown in Figure 14 and particularly with reference to the diagrammatic representation of the kiln in Figure 15, it will be noted that the kiln may be considered as divided into three zones, viz: the pre-heating zone, the burning zone and the cooling zone. Although the present type of kiln embodies a large number of controls and is accordingly capable of a very flexible action, one desired temperature curve for the kiln throughout its length is here illustrated.

In the present illustration, the kiln is designed to accommodate 43 cars and as shown in Figure 14, it will be observed that approximately the first 11 cars occupy that region constituting the pre-heating zone; the 12th to the 21st cars inclusive, occupy the burning zone and the remaining cars the cooling zone. The air supplied to the kiln is introduced at the right hand end thereof or in other words, at the end of the kiln opposite that at which the cars are introduced so that the cars pass through the kiln in opposition to the flow of air current.

Starting now from the left hand end or at the charging end for the cars, it will be observed that the temperature rises at the substantially constant and relatively rapid rate up to approximately 760 degrees Fahrenheit, which temperature is reached at substantially the location of the 6th car. From this point on the temperature rises more gradually up to approximately 1120 degrees Fahrenheit, which temperature is reached at substantially the location of the 11th car. From this point on, the temperature rises rapidly again up to approximately 2170 degrees Fahrenheit, or other maximum temperature reached in the burning zone.

In that portion of the kiln occupied by the first six cars, the heating action is relatively rapid in order to bring the ware up to the oxidizing temperature and also to remove any remaining water which may be still present. This last mentioned treatment is sometimes known as "water smoking." Between the temperatures of 760 degrees Fahrenheit and 1120 degrees Fahrenheit, oxidation of certain of the impurities takes place and it is within this range that the heating action is slowed up whereby to prolong the period that the ware occupies this region. This is found to produce a very thorough and efficient oxidizing action. After oxidation has been accomplished, the temperature can then be raised more rapidly up to the maximum burning temperature.

Referring now to the cooling portion of the kiln, it will be noted that the temperature drops quite rapidly down to approximately 1290 degrees Fahrenheit which occurs at substantially the location of the 26th car. From this point down to approximately 940 degrees Fahrenheit, the rate of cooling is decreased. The necessity for retarding the cooling action throughout this region is due to the fact that certain of the ingredients of ceramic materials have a critical temperature around the lower portion of this range, and accordingly, undergo relatively rapid contraction at this point. If the ware is not cooled uniformly the cooling action through the range of said critical temperature will crack and destroy the ceramic pieces. Accordingly it has been found desirable to provide a more gradual cooling action throughout a range of temperatures approaching the critical temperature referred to, so that the ware will be of uniform temperature throughout its entire mass at the time it cools through the critical temperature. However, as illustrated in Figure 14, after this range is passed, the ware may be more rapidly cooled, i. e., from 940 degrees Fahrenheit down to the temperature at which the ware is removed from the kiln. The various means and controls for effecting the temperature range above described and indicated in Figure 14 will be hereinafter described in detail.

In most instances, in actual practice, the free quartz in the clay will be the substance dealt with, which has a critical temperature or inversion point at exactly 1063 degrees Fahrenheit. To allow a safe margin, the slower cooling rate may be continued down to approximately 940 degrees Fahrenheit.

The kiln of the present invention embodies in its construction what may be considered two independent and separately controlled systems or fluid current areas. The above described temperature chart is a representation of a desired temperature treatment for the ware and whereas this temperature curve may be acquired without much difficulty throughout a single level in the tunnel, it is considerably more difficult to maintain the desired temperature throughout all portions in the height of the tunnel so that all of the ware, both top and bottom, inside and outside on the conveying cars is subjected to exactly the same treatment. In order to realize better results in this regard, the applicant has provided the two fluid current systems above referred to.

The tunnel space above the car tops may be considered the first system in which the air is introduced at one end, controlled by by-passing, heating and withdrawing from the opposite end of the tunnel. The current in this system comes in direct contact with the ware and is effective to influence and determine the temperature particularly of the top and outside pieces.

The second system referred to is formed within the car tops and comprises elongated passageways, extending from the one end of the kiln to the other, which passageways are in communication with by-pass passages and heating burners, and also a suction fan so that this second system is capable of control in exactly the same manner as the first system, or the space above the car tops. The two systems, although independently controlled are in direct communication, one with the other through openings in car tops, so that the actual effect upon the ware is that resulting from the joint action of both systems under the influence of the various controls.

The applicant is aware of the fact that prior to this invention it is old to circulate heated fluid currents through passages in the tops of the ware carrying cars, but the present invention is something more and distinctly different in that all of the cars collectively constitute continuous elongated passages and in addition, with the side openings form a system which at all times, is in communication with various by-passes and control ports, located in the walls of the tunnel, so that air and gases are caused to pass through and are controlled in the underneath system in much the same manner as they pass through and are controlled in the tunnel space proper.

The prior devices can only be considered as embodying passages for the circulation of gases through the car tops from the main tunnel space, in order to obtain a more thorough circulation and passage of tunnel gases up through the bottom in contact with the ware, whereas the passages through the car tops in the present invention constitute a complete system for treating the ware from beneath.

By referring now to the drawings, it will be noted that the present invention is disclosed as embodied in a kiln which comprises an elongated base 20, which extends from one end of the kiln to the other, which base may be of concrete or other suitable material. Due to the fact that various portions throughout the length of the kiln require walls of greater thickness, for one purpose or another, it is apparent that the base 20 may vary in width in the general manner disclosed in Figures 3 and 3—A.

In any event, the base is preferably provided with upstanding curbs 21 and, between the curbs, with a layer 22 of heat insulating concrete. Mounted on the insulating concrete 22 by the instrumentality of suitable anchors, tracks 23 are provided on which the ware carrying cars travel. The inner portions 24 of the side walls are built upon the insulating concrete and are formed of heat resisting or refractory brick work and the outer layers 25 are also placed on the heat insulating concrete and are formed of heat insulating brick work or other suitable material.

For the purposes of strengthening the wall construction, and to assist the walls in supporting the arch top, steel uprights 26 are provided at spaced intervals throughout the length of the kiln in bracing engagement with the side walls thereof. These uprights are anchored to the concrete base by any suitable means but are here shown secured to the brackets 27 which are fixed in the base and are tied at their top ends by the means of the tie rods 28, secured in any suitable manner such as by the brackets 29 and nuts 30.

Whereas the side walls of the kiln have been described above as being composed of two layers, by referring to the drawings, it will be observed that the inner layer takes various forms and dimensions throughout the length of the kiln, according to the details of construction thereof and no special reference will be made to the detailed formation of each portion, except insofar as concerns the various flues and the controls therefor.

It is also contemplated that various types of material may enter into the construction of the walls throughout the various regions according to the heat requirements, it of course, being desirable to conserve the more expensive materials where such are not needed.

By reference to Figures 1 and 1—A, it will be observed that a vestibule 31 is provided at one end of the kiln which end constitutes the charging end or the end in which the cars with the ware to be treated, are introduced. This vestibule comprises a suitable closed chamber having doors 32 and 33 thereon, which are of such construction as will permit the cars to pass therethrough and enter the tunnel with a minimum loss of the kiln gas. The vestibule is preferably heated to sufficient temperature to raise the temperature of the ware to a point where condensation is eliminated or at least largely reduced, upon entering the interior of the tunnel. This largely protects the ware against damage which in some instances, is occasioned by sulphuric acid dew depositing out from the kiln atmosphere on the cold surfaces of the ware. The heating of the vestibule may be accomplished by warm clean air entering the top thereof through pipe 200 and passing out through the port or ports 201, provided in the bottom region thereof.

The roof construction in this portion of the kiln is clearly shown in Figure 6, and comprises an arch 34 of fire brick which is preferably covered with a layer of heat insulating material 35. At the charging end of the kiln, preferably located above, as for instance, on the roof of the kiln, as shown in Figure 1, is a suction blower 36, the intake side of which connects with pipes 37 which branch and lead downwardly into the side walls of the tunnel. These pipes are in communication with the vertical flue 38 which in turn, communicates with the upper horizontal flue 39 and the lower horizontal flue 40. These flues are clearly shown in Figure 6. These horizontal flues it will be noted, extend parallel to each other and terminate at the same point which is approximately at the end of the pre-heating zone; that is to say, near the location where the heating or burning zone begins.

Throughout the length of these flues at spaced intervals, therealong, openings 41 are provided which establish communications between the flues and the interior of the tunnel. At this point, it may be mentioned that the openings 41 from the upper flues 39, lead directly into the tunnel, whereas the lower openings 41, from the lower flue 40, establish communications with flues or channels provided in the tops of the cars, all in a manner hereinafter more particularly described. Reference, however, at this point, may be made to Figure 7, where this construction is clearly disclosed.

In an intermediate portion of the pre-heating zone, a vertical flue 42 is provided establishing a communication between the upper flue 39 and the lower flue 40. This flue is provided with a damper 43 which is adapted to be controlled from the outside of the kiln, whereby the flue may be opened or partially or fully closed, as desired. A partition 44 is provided in the upper flue 39 adjacent the flue 42 on the side toward the charging end of the tunnel. The purpose and functions of these elements will be described below.

Dampers 45 and 46 are also provided for controlling the communication between the upper and lower flues 39 and 40 and the suction blower, all in the manner and for the purpose hereinafter more fully set forth. The series of openings 41 for both the upper flue 39 and the lower flue 40 are each individually and independently controlled by means of dampers 47, which are slidably mounted in the openings 41, as clearly shown in Figures 6 and controlled by means of the handles 48, which project through the openings 49 in the wall of the tunnel whereby they may be manually controlled from the outside. Within the lower horizontal flue 40, a partition 44—A is provided blocking direct communication through the flue so that all gases passing through flue 40, are forced into the car tops, at the location of the partition 44—a and thence back onto the opposite portion of the flue. This passage of gases is for a purpose, and produces desirable results hereinafter more fully described.

Throughout the region constituting the pre-heating zone, are a plurality of air inlets 50 located in the ceiling or roof, as clearly shown in Figures 1, 4 and 6. These inlets comprise openings of checker work in the brick ceiling having air passages 51 therethrough and enclosed by means of a housing 52 of any suitable construction, but preferably formed in the manner shown.

At one end of the housing, air inlet pipes 53 are provided, all of which connect to the main pipe 54—A as shown in Figure 2, which in turn, is connected to the exhaust side of the blower 36. The main pipe is provided with a control valve 55, whereby the amount of air supplied from the blower to the intakes may be readily controlled. Each of the individual pipes 53 is provided with independent controls 54, as shown in Figure 2, for the purpose of controlling the amount of air introduced at each of the openings 50.

From the disclosure, it will be noted that the air supplied to the outlets may be that drawn from the upper and lower horizontal flues 39 and 40, whereby a re-circulation of the air and gases of the tunnel may be effected, whereas on the other hand, the air introduced through the openings 50 may be fresh air, such as supplied by the fresh air intake 56, which is controlled by means of the control valve 57. Under usual operations, however, only "withdrawn air" will be re-circulated and rarely will fresh cool air be introduced at this point.

It is also contemplated that cool fresh air can be introduced by an injector action, that is to say, each of the pipes 53, may be formed as a nozzle with provision adjacent the end thereof for the introduction of cool air whereby the introduction of the re-circulated air causes cool, fresh air to be drawn in, in any quantity desired according to adjustment of the apparatus. The injector action may also be utilized to draw in warm, fresh air, if such is desired, which may be taken from the cooling end of the kiln or any other suitable source.

The gases withdrawn from the tunnel which are not recirculated, are discharged from the blower through pipe 58 which may lead to any particular location, either for discharge into the atmosphere or preferably to dryers which utilize the air with considerable conservation of heat.

Referring now to Figures 1 and 5, it will be observed that the heating or burning zone is located next after the pre-heating zone and that throughout the region constituting this zone, a plurality of burners 60, are provided in the two sidewalls of the tunnel, and that an upper burner 70 is provided above in the roof thereof. The cross section of the wall construction at the location of the burners, is clearly shown in Figure 7, with particular reference to the fact that this figure is taken on the line 7—7 of Figure 1. Inasmuch as each of the side burners is of substantially the same construction, the description of only one will be given here. It will be noted that each burner comprises a chamber having an upper portion 62 and a lower portion 63 which are connected in the manner shown by a vertical opening 61. The burners are designed to burn longitudinally of the wall construction with the burner at the end of the upper portion of the chamber which is nearest the discharge end of the tunnel. The products of combustion pass toward the charging end of the tunnel and thence downwardly into the lower chamber 63, where they pass through the plurality of openings 64, as shown in Figure 7. These openings 64 are on the same horizontal level as the openings 41 of the horizontal flue 40, previously described and accordingly they also discharge into the channels and flues provided in the car tops. The relative arrangement is clearly shown in Figure 7, where a car is disclosed in proper position.

The burners are here disclosed as oil burners, the fittings for which are located in cavities 65, provided in the wall, which cavities preferably extend from the outer surface of the wall partially inwardly, whereby they are protected from the interior of the tunnel and yet are readily accessible from the exterior of the kiln.

The fittings 66, are connected to the requisite supply of oil and air and are provided with the necessary control means and are adapted to discharge into the funnel-like member 67 as clearly shown in Figure 5.

At the location of each burner, an air passage 68 extends upwardly from the lower horizontal flue 69, and is capable of control by means of the dampers 71 which are slidably arranged across the air passages and are controllable from the exterior of the tunnel wall.

The air which is supplied through the air passages and is drawn from the horizontal flue 69, is taken from the tunnel at a location in the cooling zone thereof and the exact purpose and result of this action, will be hereinafter more fully described. However, it will be understood at this point, that this air will be drawn into the burner in quantities determined by the adjustment of the damper and will serve as secondary air of combustion. If, in the event the drawing action of the burners themselves, is not sufficient to induce the flow of secondary air, through the passage 69, air injectors 204 may be provided at the location of each upwardly extending air passage 68, or if desired, one larger injector 205 may be located in the horizontal passage 69 to induce secondary air to all of the burners alike.

This air along with the products of combustion, passes through the burner chamber 61, downwardly and out through the opening 64, directly into the car tops.

The upper burner also clearly shown in Figure 5, is provided with an elongated chamber 72, which is built up as an independent housing on the top of the tunnel and properly constructed of fire brick and insulating material.

The flooring of the combustion chamber 72, is provided with a plurality of openings 73, extending downwardly which lead into the narrow space 74, which is separated from the interior of the tunnel by a plurality of baffles 75 having openings 76 therebetween. From this construction, it will appear that the products of combustion are directed inwardly and are free to pass into the tunnel through the spaces 76, but direct impingement onto the ware is prevented by means of the baffles.

The burners in this instance are three in number and are also at the end of the combustion chamber adjacent the discharge end and direct their burning action in a longitudinal direction. They are also provided with conical members 77 as previously described and have the requisite fittings and control valves 78, connected to a supply of oil and air.

An air passage 79 is also provided for this burner, which as will be noted from Figure 5, extends downwardly and thence horizontally to a point 80, where it is in open communication with the top of the tunnel. An air injector 81 is provided in the air passage which, by virtue of its injector action, causes a draft of air to enter the air passage 79 and pass into the burner. Along the floor of the air passage 79, are a plurality of openings 82, the upper ends of which are closed by dampers 83, capable of horizontal sliding movement and controlled from the exterior of the tunnel. These passages permit air to be drawn from the region between the opening 80, and the burning zone for the purpose of controlling the temperatures in this region.

At the end of the combustion space, opposite that of the burner, a small peep hole 84, is preferably provided, whereby an inspection of the action inside the burner may be had. A similar provision is made in connection with the side burners as shown in Figure 5, where the opening 65 is utilized, extending partially inwardly from the outer surface of the tunnel wall with a small peep opening 86, extending into the interior of the combustion chamber 61.

At the location immediately after the burning zone, toward the discharge end of the tunnel, a plurality of slot shaped openings 87 are provided which connect with vertical air flues 88. These are provided in opposite side walls with the outlets in opposed relation. The vertical passages 88, are connected to suitable pipes 89, which in turn, are connected with a main pipe 90 leading to an air blower. The blower may be an independent and separate blower, or it may be the blower which supplies the cooling air to the tunnel introduced at the discharge end thereof. This air is forced in under pressure through the openings 87, which are preferably of relatively long, thin, slot-like construction, vertically disposed.

The air introduced in this manner, sets up a wall or barrier of air which tends to separate the heating zone from the cooling zone whereby a definite line of demarkation may be established.

Each of the vertical series of slots is capable of control by dampers 91, whereby either or both of the series of dampers may be opened or partially or completely closed. It is also possible by means of dampers 92, to control each independent slot opening thereof.

Referring now to the horizontal air flue 69, it will be noted in Figure 5, that this flue is in communication with a vertical flue 93, which in turn, communicates with the upper horizontal flue 94, and lower horizontal flue 95. The internal construction of this arrangement is clearly shown in Figure 10 and it will be noted that openings 96 are provided establishing communication between the upper and lower horizontal flues with the interior of the tunnel. Each of these openings is controlled by a sliding damper 97, of construction similar to the previously described horizontal flues and controls. Here, like before, the openings 96, which extend from the lower horizontal flue 95, are disposed in proper relationship for registration with the openings in the car tops whereby open communication is established between the horizontal flue 95 and the space provided by the flues or channels within the car tops. The upper horizontal flue 94, is controlled by the vertically disposed damper 99, and the lower horizontal flue 95, is controlled by a vertically controlled damper 100, both of which dampers are slidably mounted and are controllable from the exterior of the tunnel.

By the control of these dampers, it will be obvious that the air which is supplied as secondary air of combustion to the side burners, may be drawn from the space provided by means of the flues in the car tops or the space in the tunnel proper, or any combination thereof. This results in a withdrawal of the air in a regulated predetermined manner which will be effective in determining the extent and location of withdrawal of the cooling air. It will also be observed that by the sliding controls 97, in the openings 96, of the upper and lower flues, the particular location in the length of the flues in the car top openings, at which the air may be withdrawn, may be selected at will.

Referring now, particularly to Figures 1—A, 2—A and 3—A, it will be observed that the tunnel construction continues with walls of less thickness, to the discharging end of the tunnel which portion constitutes the cooling zone thereof. Located within the length of the cooling zone, the roof of the tunnel is provided with the elongated passage 101 and partition 102, underlying the main length of the passage, whereby to provide inlet opening 103, and outlet opening 103—A. This construction is clearly shown in cross section in Figure 12. This passage is provided for the purpose of permitting air passing through the tunnel to be by-passed throughout a portion of the length of the tunnel, whereby to remove a portion of the cooling air from that region.

As shown in Figure 1—A, air nozzles 104 are provided in the passage adjacent the inlet end thereof, whereby air ejected from the nozzle 104 induces a draft of air through the passage. These nozzles 104 may be provided in any suitable number, but are here shown as three, which are supplied with air from a common pipe 105, which communicates with a longitudinal pipe 106, supplied with air by the air blower 107 at the end of the tunnel. The air is here shown supplied by the same blower which supplies the intake air at the discharge end of the tunnel, merely for purposes of convenience, but it is obvious that any manner or means for supplying this air may be employed.

In practice, it may be found that this injector or inducing action is only necessary to a very small degree or perhaps in some instances, not at all, in order to effect the desired by-passing of air through the passage referred to, but in any event, the inducing action may be regulated to any intensity whereby to produce the desired by-passing of air.

At the discharge end of the tunnel, air nozzles 108 are provided which are shown as three in number, but may be of any suitable number, connected with the main pipe 109, which is also in communication with the blower 107.

The blower may be located in any desirable manner but in the present illustration, is shown as mounted on the floor on the outside and to one side of the tunnel. Extending from the main pipe 109, are side pipes 110, which have the downwardly extending branches 111, leading to openings 112, which are in proper horizontal position to register with the openings leading to the car tops.

From this construction it will readily appear that air which is supplied in large volume, under pressure, from the blower 107, is fed upwardly and discharged into the end of the tunnel at a location adjacent the roof thereof and at the same time, into that area provided by the flues in the car tops collectively It will further appear that air will be directed longitudinally of the tunnel through pipe 106 and discharged into the air by-pass passage by means of the nozzles 104, whereby to induce a by-pass current of air throughout this region of the tunnel.

At the discharge end of the tunnel, suitable doors 113 are provided. The tunnel at this point, is of such construction that the cars can pass therefrom without permitting any substantial escape of the air or gases of the tunnel and without disturbing the atmospheric conditions therein.

By referring particularly to Figures 7 and 13, it will be observed that the cars to be used in connection with the above described tunnel construction, for the purpose of carrying the ware, are illustrated as comprising a chassis 114, of any suitable construction and material having the bearings 115, for the axles 116 and wheels 117. The wheels of course, are track engaging wheels, and are adapted to traverse the track 23, extending through the tunnel.

On the upper surface of the chassis, a layer 118, of heat insulating cement is provided on which a plurality of built up blocks or piers 119 are mounted. These blocks are shown in the present illustration as being five in number, along the length of the car and four in number along the width of the car, each spaced from the other, by an opening or crack 120, both longitudinally and transversely.

Blocks 119 are preferably made up of heat insulating brick as shown in Figure 13. On top of each of the blocks 119 are other blocks 121, of substantially the same size and arrangement, which are preferably formed of heat resisting material.

On top of the layer of fire brick blocks 121, are a plurality of independent bricks 122, spaced longitudinally and transversely as shown, and in the transverse direction, located over the longitudinal cracks between the blocks 119 and 121.

By referring to Figure 12, it will be observed in the present illustration, that there are five rows of bricks 122. It is preferred to place additional bricks 123 of slightly less height between bricks 122 in the first, third and fifth rows, or in other words, in the two outside and middle rows. These bricks 123 are shown in Figure 13. The purpose of omitting bricks 123 in the intermediate rows is to give freer circulation of the fluid currents from the opposite sides into the space provided by the flues in the car tops.

Bridging the space between the rows of arches and resting on the tops thereof, are a series of slabs, 126, each of which is provided with a slot 127, which collectively constitute openings from the interior of the car tops to the space thereabove in the tunnel. From the showing in Figure 7, it will be observed that this construction provides a series of longitudinal flues 129, with openings 130 extending transversely thereof which register with the openings 64 and other openings on this same horizontal level provided in the tunnel wall. The arches and surface slabs of the car top may be of any suitable construction and material. The car tops are designed to not only withstand heat, but to act as a heat insulation.

One feature of this construction is that all of the cars by their end to end engagement constitute collectively, means forming elongated flues throughout the entire length of all the cars or, in other words, the entire length of the tunnel.

The longitudinal spacing of the openings 130 entering these flues from the side walls is such that they are brought in registration with the various openings referred to. Not only do the flues in the car tops extend longitudinally throughout the entire length of the tunnel but they are also inter-connected with each other and are in communication with the space above the cars whereby a complete circulating system is provided for the ware through the car tops.

It will also appear that the various currents for heating and cooling which are directed through the car top passages are brought by means of the openings 127, in direct contact with the ware carried on top of the cars.

Another feature which is important, is that this construction maintains the ware in a relatively elevated position in the kiln whereby it is subjected to the atmospheric conditions throughout the upper portion of the tunnel or that portion adjacent the roof, without requiring various supports or other means for supporting the ware now necessary in order to realize the good results obtained in this manner.

Depending from the sides of the cars, are strips 134 of suitable material, such as for instance, metal, which extend into the space provided by means of the upstanding strip 135, and the base of the wall. The strips 135 and the wall constitute a trough in which sand or other suitable sealing material, 136, is provided. This arrangement constitutes the usual type of sand seal.

There is also provided throughout the length of the tunnel, a strip-like lug or projection 137, extending from the side walls of the tunnel for cooperation with the indentations or notches 138 in the sides of the cars. This arrangement provides a barrier which serves to prevent any substantial flow of currents and radiation between the tunnel proper and the region below the car. The sand seals however, effectively separate these two regions.

The space below the cars which is here designated 140 is kept separated from the space above the cars by means of the above instrumentalities and accordingly, the car bearings and tracks are not subjected to the detrimental heat of the kiln space. This underneath space 140 is ventilated by means of cooling drafts of air introduced substantially throughout the entire length of the tunnel, and withdrawn at specified locations to give improved results.

Extending longitudinally of the tunnel, in the base 20, are two longitudinal pipes or conduits 141, which are clearly shown in the cross sectional views of the drawings and also in dotted lines in Figures 4, 4—A and 5. At an intermediate point in the length of the tunnel, as shown in Figure 3, pipes 141 connect through suitable branch pipes with a conduit 142 leading to the blower 143 which is operated by a motor 144. At spaced intervals along the length of pipes 141, upstanding outlet pipes 145 are provided with nozzles thereon, each spaced and positioned in a manner to direct a blast of air on the wheels and bearings of the cars. That is to say, the outlet pipes 145 are so positioned with regard to the length of the tunnel, that they lie opposite the locations of the wheels of the various cars in their positions of rest in the tunnel.

In operation, the cars are introduced one at a time, at a certain period apart, say several hours, consequently the entire train of cars is at rest while in the tunnel except at those periods occurring at relatively long intervals when a new car is introduced. As this takes only a matter of seconds, it will appear that by the present arrangement, that the cars are practically always located with a blast of air forced directly against the wheels and bearings thereof. The air is withdrawn from space 140, by means of a suction fan, 146, operated by a motor 147, which is in communication by passages 148 and 149, to a plurality of outlet openings 150. These openings are clearly shown in Figure 4, as comprising an open checker work, located between the tracks.

The outlet openings 150, are located throughout the portions of the tunnel which are subject to the highest temperatures, whereby a maximum circulation is maintained throughout this region to assure an efficient cooling of the under-parts of the cars. In practice, the selected locations may be substantially as shown, that is; throughout an intermediate portion, particularly at the regions effected by the high temperatures of the burning and early cooling zones. At the extreme end of the cooling zone, the air introduced beneath the cars, remains at a low enough temperature to permit its utilization as a cooling medium while travelling through a substantial portion toward the outlet located more centrally of the kiln. The individual outlets may be independently controlled by means of the dampers 150', in each pipe 149.

For the purpose of permitting an inspection of the cars, and the space below the cars, an inspection tunnel 151, is provided throughout the middle portion of the kiln, as clearly shown in Figure 1. This tunnel extends laterally and has its outlet at some suitable location, to one side of the tunnel. An inspector can enter the tunnel, proceed through the tunnel until he is below the cars, and in such position, obtain a good view of the region therebeneath.

In operation, the kiln is started up by putting the burners in operation without introducing the air currents until such time as the tunnel becomes hot. After the tunnel is heated up to a sufficient degree, the air is then introduced and the various valves and passages regulated for the purpose of establishing the desired temperatures and draft conditions throughout all portions of the tunnel. In this condition, the tunnel will contain a complete train of empty cars.

Although it is not necessary, it is considered desirable to place brick work on the cars during the time the draft conditions are being adjusted, for the purpose of providing a material which will occupy substantially the same space and volume as the work being treated, whereby more accurate assimilation of operating conditions is produced.

With the temperature and draft conditions properly controlled, a car laden with the ware to be treated, is introduced into the vestibule at the introduction end of the tunnel, as shown at the left hand end of Figure 1. While in the vestibule, the ware is slightly heated by the current of warm air passing therethrough, introduced through pipe 200 and discharged through the outlet 201. After the ware is heated in the vestibule, it is introduced into the tunnel and a new car is placed in the vestibule for pre-heating.

In this position, the newly introduced car becomes heated and the first car presents its ware to the pre-heating currents of the tunnel. The ware having thus been pre-heated in the vestibule, the tendency for the atmosphere in the tunnel to condense on the surface of the ware, is at least largely reduced.

This factor tends to improve the character of the ware as in some instances, sulphuric acid formed from the gases in the tunnel, condenses on the surface of the ware and dulls and damages the surface thereof. However, in the present invention, the heating prior to introduction, eliminates this to a substantial degree.

Thereafter, each car is successively introduced at a proper interval of time, calculated to produce the requisite time for a single car to travel the entire length of the tunnel. Of course, the factors which govern, depend upon the ware being treated and the size of, and conditions prevailing in the tunnel. However, it will readily appear that each car is caused to travel through the tunnel and to thereby present the ware carried thereon, to be subjected to the various temperature and draft conditions prevailing therein. When the tunnel is full of ware carrying cars, the introduction of an additional car will force the endmost car out of the opposite end of the tunnel. From this point, the car can be unloaded and carried back to the entrance end and there re-loaded and again introduced, as before.

As above set forth, the draft of air, within the tunnel is introduced at the discharge end both through the nozzles 108 at the top of the tunnel and, if desired, through openings 112, which are in direct communication with the spaces provided in the car tops. The car top spaces, when considered collectively, constitute longitudinal flues extending throughout the entire length of the tunnel which are not only in communication with the cooling drafts of air, as described, but also with the products of combustion supplied from the side burners through openings 64, and also the withdrawing openings 41, shown in Figure 6.

It will thus appear, that the space below the car tops provided by the longitudinal flues, is in the nature of a sub-system having all of the elements for establishing the temperature and draft conditions as are provided for the tunnel space proper. The air which is introduced of course, has a cooling effect on the tunnel and thereby establishes the coolest temperature at the discharge end. This air, however, becomes progressively warmer, as it travels toward the burning zone and consequently the cooling effect becomes less and less in those regions nearer the burning zone.

When the air reaches the by-pass, 101, it enters through the opening 103, with the result that a large portion of the cooling air is withdrawn throughout that portion of the tunnel along which the by-pass 101 extends. The by-passed air, however, is again introduced into the tunnel. Through openings 103—A, where it again exerts an increased cooling effect.

If under ordinary conditions, sufficient air is not by-passed to produce the desired change in cooling effect, the by-passage of air may be created by injecting additional air through the nozzles 104. These nozzles it will be noted, from Figure 2—A are supplied with air from the blower 107. This establishes an injector action and assures the proper by-passing action. It will also appear that this permits the by-passing action to be readily controlled. It will therefore appear that a cooling action is provided in the tunnel, which corresponds to the curve shown in Figure 14, where the decreased rate in cooling, as for instance between 1290 degrees Fahrenheit and 940 degrees Fahrenheit is effected by the by-passing of air as just described.

After the air has returned to the tunnel through outlet 103—A, and it once more exerts a cooling effect in the tunnel, the point at which this cooling action is terminated, can be established at will. This is accomplished by the selecting of the location at which this cooling air is withdrawn, by regulating the slide valves 97 of the upper and lower flues 94 and 95. The valves 83, located in the ceiling are also controllable, which assists in establishing the location at which the cooling effect is terminated.

In any event, the cooling air is withdrawn at the desired location and quantity and is passed, some through the passage 79, to supply secondary air of combustion to the upper burners and some through the passages 69, in the two side walls, to supply secondary air of combustion to the side burners. Here again, if the natural by-passing is not in accordance with the conditions desired, the action may be increased or regulated by means of the air injectors 81, in the upper passage and 204 or 205, in the lower passage. The injectors 204 effect the air passing to each independent burner, whereas the injectors 105 effect the air in the passage supplied to all burners alike. Any combination of these injectors can be used as desired. It will thus appear that the cooling air is withdrawn and supplied to the burners as secondary air of combustion which is subsequently introduced into the tunnel as a part of the heating medium.

In addition, air nozzles 87 are provided as shown in Figure 5, through which a blast of air may be supplied for establishing a barrier or curtain between the cooling zone and the pre-heating zone, whereby a definite line of demarkation is established.

The operation of the burner has been above described, but it will be observed that each is illustrative of the oil burning type, being supplied with oil and air of combustion and also secondary air of combustion as above described. It is intended under normal operations, not to use the air injectors 81, 204, and 205, as in most instances, the natural suction created by the burners in operation, will be sufficient to draw in the secondary air of combustion. It is also important to note that by providing the upper and lower air withdrawing passages, 94 and 95, which are also controllable by the dampers 99 and 100, that cooling air may be withdrawn from the space below the car tops as well as the tunnel space and that any combined withdrawing action may be produced.

The secondary air of combustion and the products of combustion, which establish the high temperatures desired, pass from the respective burners, through the burner chambers, by a circuitous path and are then discharged into the tunnel space and into the space provided by the car tops. The circuitous path referred to assures that the fire of the burners is not charged directly against the ware, such as might cause damage thereto.

Due to the effect of the burners, which act from the top and bottom of the ware, the ware is subjected to the high temperatures desired indicated on the curve shown on the chart in Figure 14.

Proceeding, however, toward the pre-heating zone, it will be observed that as the gases give up their heat to the ware being treated, that the temperature is reduced in the manner indicated on the temperature curve. The temperature reduction is substantially constant as indicated by the straight line in Figure 14, down to some point, as for instance, 1120 degrees Fahrenheit, beyond which point, the rate of pre-heating is effected at a reduced rate. This break in the pre-heating curve, is produced by withdrawing the pre-heating air through the openings 41, both in the tunnel space proper, and in the car top space which is withdrawn by means of the suction fan 36. The air and gas pass toward the entrance end of the tunnel, through the lower flue 40.

It will be noted that the upper flue 39, is blocked by the partition 44, and that the withdrawn gases, in the end of the flue 39, adjacent the pre-heating zone, pass downwardly through vertical flue 42, into the lower flue 40. The lower flue 40, is also blocked by the partition 44—A, so that all of the gases thus withdrawn in passing through the lower flue 40, are forced into the car tops, and therealong toward the charging end of the tunnel and thence outwardly into the flue 40, once more. From the end of the flue 40, they pass upwardly through the vertical flue 38, and are withdrawn by the suction fan. The purpose of this action is two-fold, first; to produce the retarding pre-heating action referred to by withdrawing the heating gases and re-introducing them at the location of the entrance end of the tunnel through the space in the car tops, and secondly, to assure a rapid heating of the car tops themselves, to eliminate the cars as heat absorbing mediums.

By providing the longitudinal flues in the tunnel walls throughout the region of the pre-heating zone, additional space is provided for the gases in the portion where the volume of gas passing through the tunnel is relatively large, due to heat expansion and thereby reduces the amount of suction necessary and makes the difference in resistance of different car loadings less important.

By rapidly heating the car tops up to the temperature of the surrounding atmosphere, the temperature conditions throughout a major portion of the tunnel are undisturbed, being free from the influence of relatively large heat absorption, such as might be the case, if the car tops were not promptly heated.

Heated air which is withdrawn, may then be re-circulated from the preheating zone by introduction through the pipes 54—A and 53, entering through the top of the tunnel so as to establish a down draft in the pre-heating zone. It will therefore appear that in the pre-heating zone, particularly at the portion thereof adjacent the entrance end, a downdraft is created which serves to drive all of the gases downwardly through the ware and through the car tops and thence outwardly through the flues 40.

This assures a rapid and uniform heating of the ware, raising the temperature of the ware located throughout the lower region as well as the top and outside ware, whereby uniform heating is accomplished.

Although the above description sets forth a typical operation, full account and consideration should be given to all the various controls and the possible combinations of adjustment thereof. It should be noted that by adjusting the various controls, that various sorts of combined effects can be produced for establishing the desired temperature and draft conditions.

In the pre-heating zone, it will appear that the heating action is decreased throughout a range, at which the oxidizing action is accomplished whereby a prolonged heating period is produced within that range of temperature suitable for oxidation. It will further appear that while the kiln is in operation, that a circulation is maintained in a space below the cars, whereby a thorough and efficient cooling action is accomplished and the bearings, wheels and other car parts, are maintained safe from damage by the heat of the kiln.

The applicant does not wish to be limited by the present disclosure which is given merely by way of example, but it will be observed from the description of this illustrative embodiment that a new and improved tunnel kiln is provided which will accomplish the improved results and advantages herein above referred to.

I claim:

1. A tunnel kiln of the character described having in combination, an enclosed tunnel space for accommodating ware, a combustion chamber and means for establishing in certain portions of the length of said space, cooling and heating currents, and a plurality of movable ware supporting means having communicating longitudinal flues therein with side openings adapted for registration with flues for cooling drafts and heating drafts derived from said combustion chamber in the walls of said tunnel.

2. A tunnel kiln of the character described having in combination, an enclosed tunnel space for accommodating ware, a combustion chamber and means for establishing in certain portions of the length of said space, cooling and heating currents, and a plurality of movable ware supporting means having communicating longitudinal flues therein with side openings adapted for registration with flues, for cooling drafts and heating drafts derived from said combustion chamber, in the walls of said tunnel, and means establishing communication between said longitudinal flues and said tunnel space.

3. A tunnel kiln of the character described having a burning zone comprising in combination, an elongated tunnel, a combustion chamber construction and a plurality of independent travelling elements collectively providing a continuous ware supporting surface throughout the length of said tunnel, said elements being constructed to provide continuous longitudinal flues having lateral openings, and openings in the walls of said tunnel communicating with said combustion chamber and registering with said lateral openings and located throughout the burning zone of said tunnel.

4. A tunnel kiln of the character described having a cooling zone, comprising in combination, an elongated tunnel construction and a plurality of independent travelling elements collectively providing a continuous ware supporting surface throughout the length of said tunnel, said elements being constructed to provide continuous longitudinal flues having lateral openings, and openings in the walls of said tunnel registering with said lateral openings and located within the cooling zone of said tunnel, said wall being connected to ducts through which warm air is withdrawn from said cooling zone.

5. A tunnel kiln of the type having a burning zone and a cooling zone comprising in combination, a combustion chamber, an elongated tunnel construction having means therein constituting a continuous travelling ware supporting surface, said means being provided with passages collectively constituting continuous longitudinal flues, lateral openings extending from said longitudinal flues, and means for supplying cooling air in one end of said tunnel and openings in the walls of said tunnel throughout the burning zone, in registration with said lateral openings for introducing heating drafts derived from said combustion chamber to said longitudinal flues.

6. A tunnel kiln of the type having a pre-heating zone, a burning zone and a cooling zone comprising in combination, an elongated tunnel construction having means therein constituting a continuous travelling ware supporting surface, said means being provided with passages collectively constituting continuous longitudinal flues, lateral openings extending from said longitudinal flues and openings for withdrawing warm air in the cooling zone portion of the walls of said tunnel, in registration with said lateral openings, and openings in the burning zone portion of the walls of said tunnel in registration with said lateral openings, and openings in the pre-heating zone portion of the walls of said tunnel in registration with said lateral openings.

7. A tunnel kiln of the type having a burning zone and a cooling zone comprising in combination, an elongated tunnel construction having means therein constituting a continuous travelling ware supporting surface, said means being provided with passages collectively constituting continuous longitudinal flues, lateral openings extending from said longitudinal flues and openings for withdrawing warm air in the cooling zone portion of the walls of said tunnel, in registration with said lateral openings and openings in the burning zone portion of the walls of said tunnel in registration with said lateral openings and means providing communications between said longitudinal flues and the interior of said tunnel.

8. A tunnel kiln of the type having a pre-heating zone, a burning zone and a cooling zone comprising in combination, an elongated tunnel construction having means therein constituting a continuous travelling ware supporting surface, said means being provided with passages collectively constituting continuous travelling ware supporting surface, said means being provided with passages collectively constituting continuous longitudinal flues, lateral openings extending from the side of said means to said longitudinal flues and openings for withdrawing warm air in the cooling zone portion of the walls of said tunnel, in registration with said lateral openings and openings in the burning zone portion of the walls of said tunnel, in registration with said lateral opening, and openings in the pre-heating zone portion of the walls of said tunnel in registration with said lateral openings, and means providing communication between said longitudinal flues and the interior of said tunnel.

9. A tunnel kiln of the character having a pre-heating zone comprising in combination, an elongated tunnel construction and a plurality of ware supporting means having passages therethrough collectively forming longitudinal flues below the ware, upper and lower longitudinal flues in the tunnel walls in the pre-heating zone and means establishing communication between said longitudinal flues below the ware and the lower of said last named flues.

10. A tunnel kiln of the character having a pre-heating zone comprising in combination, an elongated tunnel construction and a plurality of ware supporting means having passages therethrough collectively forming longitudinal flues below the ware, upper and lower longitudinal flues in the tunnel walls in the pre-heating zone and means establishing communication between said longitudinal flues below the ware and the lower of said last named flues and means establishing communication between the upper flue in said tunnel wall and the interior of said tunnel.

11. A tunnel kiln of the character having a pre-heating zone comprising in combination, an elongated tunnel construction and a plurality of ware supporting means having passages therethrough collectively forming longitudinal flues below the ware, upper and lower longitudinal flues in the tunnel walls in the pre-heating zone and means establishing communication between said longitudinal flues below the ware and the lower of said last named flues and control means establishing communication between the upper flue in said tunnel wall and the interior of said tunnel.

12. A tunnel kiln of the character described, having a pre-heating zone comprising in combination, an elongated tunnel construction, a plurality of ware supporting means, having passages therethrough collectively forming longitudinal flues below the ware, openings in the walls of said tunnel in the pre-heating zone and flues in communication with said openings and means connected to said flues for withdrawing air and gases from the interior of the tunnel through said openings.

13. A tunnel kiln of the character having a pre-heating zone comprising in combination, an elongated tunnel construction and a plurality of ware supporting means having passages therethrough collectively forming longitudinal flues below the ware, upper and lower longitudinal flues in the tunnel walls in the pre-heating zone and means establishing communication between said longitudinal flues below the ware and the lower of said last named flues, and means for withdrawing air and gas from the lower of said flues in the tunnel walls and for again introducing a portion of said air and gas in said preheating zone, whereby to produce a partial re-circulation.

14. A tunnel kiln of the character having a pre-heating zone comprising in combination, an elongated tunnel construction and a plurality of ware supporting means having passages therethrough collectively forming longitudinal flues below the ware, upper and lower longitudinal flues in the tunnel walls in the pre-heating zone and means establishing communication between said longitudinal flues below the ware and the lower of said last named flues and means establishing communication between the upper flues in said tunnel wall and the interior of said tunnel, and means for withdrawing air and gas from said flues in the tunnel walls and for again introducing a portion of said air and gas in said pre-heating zone, whereby to produce a partial re-circulation.

15. A tunnel kiln of the character described, having a pre-heating zone comprising in combination, an elongated tunnel construction, a plurality of ware supporting means, having passages therethrough collectively forming longitudinal flues below the ware, openings in the walls of said tunnel in the pre-heating zone and flues in communication with said openings and means connected to said flues for withdrawing air and gases from the interior of the tunnel through said openings, and for again introducing a portion of said withdrawn air and gas in said pre-heating zone, whereby to produce a partial re-circulation.

16. A tunnel kiln of the character described having a pre-heating zone comprising in combination, an elongated tunnel construction and a plurality of ware supporting means having passages therethrough, collectively forming continuous longitudinal air and gas spaces below the level of the ware, and means for withdrawing air and gas from said space and from the interior of said tunnel throughout selected locations in the length of said pre-heating zone.

17. A tunnel kiln of the character described having a pre-heating zone comprising in combination, a longitudinal tunnel construction, a plurality of ware supporting means having passages therethrough collectively forming longitudinal air and gas spaces below the level of the ware, means for withdrawing air and gases from said tunnel space throughout one portion of the length of said pre-heating zone and circulating said withdrawn air and gases through said air and gas space at another location in the length of said pre-heating zone.

18. A tunnel kiln of the character described having a pre-heating zone comprising in combination an elongated tunnel construction, a plurality of ware supporting means having passages therethrough collectively forming continuous longitudinal air and gas spaces below the ware, and upper and lower longitudinal flues in one wall of said tunnel, openings establishing communications between the upper of said flues and the interior of the tunnel, and other openings establishing communication between the lower of said flues and said air and gas space, a partition in the intermediate portion of said upper flue and a passage between said upper and lower flues adjacent said partition.

19. A tunnel kiln of the character described, having a pre-heating zone comprising in combination, an elongated tunnel construction, a plurality of ware supporting means having passages therethrough collectively constituting longitudinal air and gas spaces, a flue in one wall of said tunnel having openings in communication with said air and gas spaces whereby air and gas may be withdrawn from said space into said flue and a partition in said flue interrupting the passage provided thereby, whereby air and gas passing through said flue are caused to circulate into and out of said air and gas spaces.

20. A tunnel kiln of the character described comprising an elongated tunnel construction and a plurality of ware carrying means having continuous longitudinal air and gas spaces therein, means for withdrawing heated air from predetermined regions of said pre-heating zone and introducing said air and gases into the air and gas space provided in said ware carrying means, at a location near the introducing end of said tunnel.

21. A tunnel kiln comprising a tunnel and ware carrying means, said tunnel providing a tunnel space and a continuous air and gas space below said ware carrying means, means for selectively withdrawing air and gas from either or both of said spaces and selectively re-introducing a portion of the withdrawn air and gas at one or more predetermined locations in the preheating zone.

22. A tunnel kiln comprising a tunnel and ware carrying means, said tunnel providing a tunnel space and a continuous air and gas space below said ware carrying means, means for selectively withdrawing air and gas from either or both of said spaces, and means for circulating said air and gas through a space in said ware carrying means adjacent the introduction end of said tunnel.

23. A tunnel kiln of the character described having in combination an elongated tunnel and ware carrying means having continuous longitudinal air and gas spaces provided therein, openings in said means providing communication between said spaces and the interior of said tunnel and means for causing the withdrawal of the air and gas in said tunnel space by its passage downwardly through the ware supporting means into the space in the ware supporting means.

24. A tunnel kiln of the character described having in combination, an elongated tunnel and ware carrying means having continuous longitudinal air and gas spaces provided therein, openings in said means providing communication between said spaces and the interior of said tunnel and means for causing the withdrawal of the air and gas in said tunnel space by its passage downwardly through the ware supporting means into the space in the ware supporting means, and means for re-introducing a portion of said withdrawn air and gas into said tunnel space.

25. A tunnel kiln having a heating or burning zone, comprising an elongated tunnel, and a plurality of ware supporting means having passages therein collectively forming continuous longitudinal flues below the ware, sources of hot products of combustion located in the walls of said tunnel and communication between said sources of gases and said flues.

26. A tunnel kiln having a heating or burning zone, comprising an elongated tunnel, and a plurality of ware supporting means having passages therein collectively forming continuous longitudinal flues below the ware, sources of hot gases located in the walls of said tunnel and communication between said sources of gases and said flues and a source of hot gases discharging from above into the main tunnel space.

27. A tunnel kiln having a heating or burning zone comprising an elongated tunnel with separately controlled combustion chambers introducing products of combustion through openings located both in the top and side walls thereof.

28. A tunnel kiln having a heating or burning zone comprising an elongated tunnel construction having burners in the side and top walls thereof, said burners each having a combustion chamber and a circuitous outlet to the interior of said tunnel.

29. A tunnel kiln having a heating or burning zone comprising an elongated tunnel construction having burners in the side and top walls thereof, said burners each having a combustion chamber and a circuitous outlet to the interior of said tunnel and ware carrying means having air and gas surfaces and openings in communication with the outlets of the side wall burners.

30. The process of treating ceramic ware in a kiln which comprises providing a burner in a combustion space and supplying secondary air of combustion from the air within said kiln to the burner, solely by the drawing action of the burner, and subjecting said ware to the heat of said burner.

31. In a tunnel kiln of the character described comprising in combination, an elongated tunnel construction and a plurality of ware supporting means having passages therethrough collectively forming continuous longitudinal air and gas spaces, burners for said kiln having gas outlets in the sides and top of said tunnel, said side outlets being in communication with said air and gas spaces provided in said ware carrying means.

32. A tunnel kiln having a heating or burning zone comprising in combination, an elongated tunnel, and a cooling zone and means forcibly injecting a blast of air across the tunnel space approximately at the location between said burning and cooling zones, said air to be under pressure substantially higher than the pressure in said tunnel.

33. A tunnel kiln comprising in combination a burning zone and a cooling zone comprising an elongated tunnel, air nozzles adapted to direct a blast of air transversely of said tunnel, positioned at a plurality of locations in the length of said tunnel in the neighborhood of the region between said burning and cooling zones, whereby a barrier of air may be set up selectively located to effectively separate said zones.

34. A tunnel kiln having a burning zone and a cooling zone comprising in combination, an elongated tunnel and a plurality of ware carrying means having passages therein collectively forming continuous longitudinal air and gas spaces, upper and lower flues in the walls of said tunnel, in communication with the space in said tunnel and said air and gas spaces respectively, burners for said burning zone and a communication between said burners and said flues.

35. A tunnel kiln having a burning zone and a cooling zone comprising in combination, an elongated tunnel and a plurality of ware carrying means having passages therein collectively forming continuous longitudinal air and gas spaces, upper and lower flues in the walls of said tunnel, in communication with the space in said tunnel and said air and gas spaces respectively, burners for said burning zone and a communication between said burners and said flues and controlling means for said flues whereby secondary air of combustion may be selectively withdrawn from desired locations of said cooling zone to be supplied as secondary air of combustion.

36. A tunnel kiln having a cooling zone comprising an elongated tunnel with a fluid passage in the walls thereof, and in communication with the interior of said tunnel, air or gas injectors in said passage, a fluid injector in said passage having a nozzle positioned in the direction of fluid flow whereby in operation to induce a withdrawal of air from said tunnel into said passage.

37. A tunnel kiln having a cooling zone and means for introducing cooling air near one end of said cooling zone and a by-pass for cooling air so introduced located in an intermediate portion of said cooling zone for withdrawing air at one location in said cooling zone and reintroducing said withdrawn air at another location in said cooling zone.

38. A tunnel kiln having a cooling zone comprising in combination, an elongated tunnel and ware carrying means having passages therein collectively forming continuous longitudinal air and gas spaces, means for supplying cooling air into the interior of said tunnel and means for withdrawing air directly from said air and gas spaces.

39. A tunnel kiln having a cooling zone comprising in combination, an elongated tunnel and ware supporting means having passages therein collectively forming continuous longitudinal air and gas spaces, means for withdrawing air directly from said air and gas spaces, and openings in the tops of said ware supporting means establishing communication between said air and gas spaces and the interior of said tunnel.

40. A tunnel kiln having a cooling zone comprising in combination an elongated tunnel, means for supplying cooling air at one end of said cooling zone and at least partially withdrawing said air at the other end of said cooling zone, and means for by-passing a portion of said cooling air throughout the intermediate portion of said cooling zone.

41. A tunnel kiln having a cooling zone comprising in combination, an elongated tunnel, means for supplying cooling air at one end of said cooling zone and at least partially withdrawing said air at the other end of said cooling zone, and means for by-passing a portion of said cooling air throughout the intermediate portion of said cooling zone and burners for the heating zone of said kiln.

42. A tunnel kiln having a cooling zone and means for injecting cooling air at one end of said cooling zone and a by-pass throughout the intermediate length of said cooling zone and an air ejector located in said by-pass having its nozzle directed in the direction of flow through said by-pass.

43. In combination with a tunnel kiln, a plurality of ware carrying cars, each comprising a wheeled chassis and a super-structure, longitudinal passages through said super structure, adapted to collectively form continuous air and gas flues through all of said cars, lateral openings extending from said flues having uniform predetermined spacing throughout the entire length of said plurality of cars and openings through the tops of said cars establishing communications between said flues and the interior of said tunnel kiln.

44. In combination with a tunnel kiln, a ware carrying car comprising a wheeled chassis and a super-structure, a plurality of longitudinal parallel passages through said structure in communication one with the other, and having lateral openings extending to the outside of said car and openings through the tops of said cars establishing communications between said flues and the interior of said tunnel kiln.

45. A car for use with tunnel kilns, comprising a wheeled chassis and a super-structure on said chassis, said super-structure comprising a plurality of spaced piers and longitudinal rows of spaced arches on said piers and a decking support on said arches.

46. A car for use with tunnel kilns, comprising a wheeled chassis and a super-structure on said chassis, said super-structure comprising a plurality of spaced piers and longitudinal rows of spaced arches on said piers and a decking supported on said arches, and openings in said decking over-lying the space between said arches.

47. In combination with a tunnel kiln, a plurality of cars in said kiln, each comprising a chassis and a super-structure with a longitudinal passage through said super-structure, said passage in said cars collectively forming a continuous flue throughout the length of said tunnel and openings through the tops of said cars establishing communications between said passage and the interior of said tunnel and lateral openings establishing communications between said passage and openings in the side walls of said tunnel.

48. A tunnel kiln comprising in combination, an elongated tunnel having elongated ware supporting surface therein, openings in the walls of said tunnel, for supplying cooling and heating fluid currents to the space below said ware supporting surface, and openings in the wall of said tunnel for supplying cooling and heating fluid currents to the space above said ware supporting surface, and means for supplying said openings.

49. The method of heat treating ceramic ware, which consists in subjecting it to heating currents effective to raise the temperature thereof at a predetermined rate for a predetermined period, then at a relatively slower rate, and then again at approximately the original rate and continuing said heat treatment until the maximum temperature desired is reached and maintained for a predetermined period and then cooling said ware at a predetermined rate and then through a predetermined period, at a relatively slower rate and finally continuing the heat treatment, at a more rapid rate.

50. In heat treating ceramic ware, the process of cooling which consists in subjecting the ware to cooling currents while advancing the ware through a predetermined region and by-passing a portion of the cooling air throughout a portion of said cooling region whereby to produce a retarded cooling action throughout said portion of said cooling region.

51. In combination with a tunnel kiln, a plurality of ware carrying cars having passages therein collectively constituting continuous longitudinal flues, lateral openings extending from the sides of said cars to said flues, uniformly spaced throughout the length of said plurality of cars, other openings in the walls of said tunnel, uniformly spaced for registration with said first openings and means for advancing said cars intermittently through said tunnel and to leave them at periods of rest, with said openings in registration said cars having openings through their tops establishing communications between said flues and the interior of said tunnel.

52. In combination with a tunnel kiln, a plurality of ware carrying cars, adapted to be advanced intermittently through said tunnel kiln, means for sealing the space above said cars from the space below said cars, and air inlet means positioned in the space below said cars in a manner to direct blasts of air directly onto the wheels and bearings of said cars.

53. A tunnel kiln of the character described having a cooling zone comprising in combination an elongated tunnel construction and means for introducing cooling air adjacent the discharge end of the cooling zone, and a passage for accommodating cooling air having an intake and outlet in said cooling zone, spaced apart a predetermined distance, for accommodating by-pass cooling air, whereby to reduce the cooling effect throughout a predetermined range of said cooling zone.

54. A tunnel kiln of the character described, having a cooling zone comprising in combination an elongated tunnel construction and means for introducing cooling air adjacent the discharge end of the cooling zone, and a passage for accommodating cooling air having an intake and outlet in said cooling zone spaced apart a predetermined distance, for accommodating by-pass cooling air, whereby to reduce the cooling effect throughout a predetermined range of said cooling zone, and means for injecting fresh, cooling air in said passage whereby to induce the by-pass of cooling air in said passage.

55. In combination with a tunnel kiln, a plurality of ware carrying cars, adapted to be advanced intermittently through said tunnel kiln, means for sealing the space above said cars from the space below said cars, and air inlet means positioned in the space below said cars, and air inlet means positioned in the space below said cars in a manner to direct blasts of air directly onto the wheels and bearings of said cars, and means for withdrawing the air from the space below said cars.

56. In combination, a ware carrying car and a tunnel kiln, said car having space below the top thereof and lateral openings communicating with said space, openings in the wall of said tunnel for introducing heating, and cooling gases and openings for withdrawing gases, said car being adapted to intermittently advance through said tunnel and to present said lateral openings successively in registration with certain of said last named openings.

57. A tunnel kiln of the type having a preheating zone, a burning zone and a cooling zone, comprising in combination, an elongated tunnel construction having means therein constituting a continuous travelling ware supporting surface, said means being provided with passages collectively constituting continuous longitudinal flues, lateral openings extending from said longitudinal flues, means for supplying cooling air in the cooling zone portion of said tunnel, and openings in the burning zone portion of the walls of said tunnel in registration with said lateral openings, and openings in the pre-heating zone portion of the walls of said tunnel, in registration with said lateral openings.

58. A tunnel kiln having a cooling zone and means for introducing cooling air into said cooling zone, and a by-pass for cooling air located in a portion of said cooling zone for withdrawing a portion of said air at one location of said cooling zone and reintroducing said withdrawn air at another location of said cooling zone.

59. The process of cooling ware being treated in a tunnel kiln, which consists in establishing a current of cooling air and advancing said ware in opposition to said air current and diminishing the quantity of cooling air exposed to said ware throughout a portion of the cooling period.

60. A tunnel kiln of the type having a burning zone and a cooling zone comprising in combination, an elongated tunnel construction having means therein constituting a continuous travelling ware supporting surface, said means being provided with passages collectively constituting continuous longitudinal flues, lateral openings extending from said longitudinal flues and means for supplying cooling air in the cooling zone portion of said tunnel, and openings in the burning zone portion of the walls of said tunnel in registration with said lateral openings and top openings through said ware supporting surface providing communications between said longitudinal flues and the interior of said tunnel.

61. A tunnel kiln having a burning zone comprising an elongated tunnel with a controllable combustion chamber for introducing products of combustion into the top region of said tunnel and a second separately controllable combustion chamber for introducing products of combustion below the top region of said tunnel through openings in the side walls thereof.

62. A tunnel kiln having a burning zone comprising an elongated tunnel construction and a combustion chamber for supplying products of combustion to the burning zone of said tunnel, a plurality of openings connecting said tunnel and combustion chamber and means for independently controlling the passage of gas through said openings.

63. In combination with a kiln, a tunnel and a combustion chamber therefor, a plurality of communicating passages for products of combustion between said tunnel and combustion chamber and means for controlling said passages for selectively establishing the desired combination of communicating passages.

64. A tunnel kiln comprising a tunnel having a burning zone and a cooling zone, and a combustion chamber for said burning zone, a plurality of passages between said cooling zone and combustion chamber for withdrawing secondary air of combustion from said cooling zone and means for controlling said passages for selectively withdrawing air from particular locations in said cooling zone.

65. A tunnel kiln comprising a ware treating tunnel having a burning zone and a cooling zone, and a combustion chamber in said burning zone, and a passage between said cooling zone and combustion chamber for withdrawing secondary air of combustion from said cooling zone, said passage entering the cooling zone at the lower portion of said ware treating tunnel whereby the withdrawn air is taken from the bottom portion thereof.

66. A tunnel kiln comprising a ware treating tunnel having a burning zone and a cooling zone, and a combustion chamber in said burning zone, means for introducing cooling air in said cooling zone adjacent the discharge end of said tunnel and for causing said air to pass toward said burning zone, a passage for withdrawing said air from said cooling zone at a location near the burning zone, said passage entering the cooling zone at the lower portion thereof whereby the withdrawn air is taken from the lower portion of said ware treating tunnel.

Signed at Chicago, Illinois, this 21st day of February, 1930.

WALTER A. HULL.